US006582873B2

(12) United States Patent
Jiang et al.

(10) Patent No.: US 6,582,873 B2
(45) Date of Patent: *Jun. 24, 2003

(54) TONER COAGULANT PROCESSES

(75) Inventors: Lu Jiang, Oakville (CA); Nan-Xing Hu, Oakville (CA); Raj D. Patel, Oakville (CA); Walter Mychajlowskij, Mississauga (CA); Michael A. Hopper, Toronto (CA)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/164,162

(22) Filed: Jun. 5, 2002

(65) Prior Publication Data

US 2002/0187416 A1 Dec. 12, 2002

Related U.S. Application Data

(62) Division of application No. 09/877,747, filed on Jun. 11, 2001, now Pat. No. 6,495,302.

(51) Int. Cl.$^7$ .................................................. C08J 3/215

(52) U.S. Cl. .................................. 430/137.14; 523/335

(58) Field of Search ...................... 430/137.14; 523/335

(56) References Cited

U.S. PATENT DOCUMENTS

| | | | | | |
|---|---|---|---|---|---|
| 4,558,108 | A | | 12/1985 | Alexandru et al. | 526/340 |
| 4,797,339 | A | | 1/1989 | Maruyama et al. | 430/109 |
| 4,983,488 | A | | 1/1991 | Tan et al. | 430/137 |
| 4,996,127 | A | | 2/1991 | Hasegawa et al. | 430/109 |
| 5,278,020 | A | | 1/1994 | Grushkin et al. | 430/137 |
| 5,290,654 | A | | 3/1994 | Sacripante et al. | 430/137 |
| 5,308,734 | A | | 5/1994 | Sacripante et al. | 430/137 |
| 5,344,738 | A | | 9/1994 | Kmiecik-Lawrynowicz et al. | 430/137 |
| 5,346,797 | A | | 9/1994 | Kmiecik-Lawrynowicz et al. | 430/137 |
| 5,348,832 | A | | 9/1994 | Sacripante et al. | 430/109 |
| 5,364,729 | A | | 11/1994 | Kmiecik-Lawrynowicz et al. | 430/137 |
| 5,366,841 | A | | 11/1994 | Patel et al. | 430/137 |
| 5,370,963 | A | | 12/1994 | Patel et al. | 430/137 |
| 5,403,693 | A | | 4/1995 | Patel et al. | 430/137 |
| 5,405,728 | A | | 4/1995 | Hopper et al. | 430/137 |
| 5,418,108 | A | | 5/1995 | Kmiecik-Lawrynowicz et al. | 430/137 |
| 5,496,676 | A | | 3/1996 | Croucher et al. | 430/137 |
| 5,501,935 | A | | 3/1996 | Patel et al. | 430/137 |
| 5,527,658 | A | | 6/1996 | Hopper et al. | 430/137 |
| 5,585,215 | A | | 12/1996 | Ong et al. | 430/107 |
| 5,650,255 | A | | 7/1997 | Ng et al. | 430/137 |
| 5,650,256 | A | | 7/1997 | Veregin et al. | 430/137 |
| 5,723,253 | A | | 3/1998 | Higashino et al. | 430/166 |
| 5,744,520 | A | | 4/1998 | Kmiecik-Lawrynowicz et al. | 523/334 |
| 5,747,215 | A | | 5/1998 | Ong et al. | 430/137 |
| 5,763,133 | A | | 6/1998 | Ong et al. | 430/137 |
| 5,766,818 | A | | 6/1998 | Smith et al. | 430/137 |
| 5,804,349 | A | | 9/1998 | Ong et al. | 430/110 |
| 5,827,633 | A | | 10/1998 | Ong et al. | 430/137 |
| 5,840,462 | A | | 11/1998 | Foucher et al. | 430/137 |
| 5,853,944 | A | | 12/1998 | Foucher et al. | 430/137 |
| 5,863,698 | A | | 1/1999 | Patel et al. | 430/137 |
| 5,869,215 | A | | 2/1999 | Ong et al. | 430/137 |
| 5,902,710 | A | | 5/1999 | Ong et al. | 430/110 |
| 5,910,387 | A | | 6/1999 | Mychajlowskij et al. | 430/110 |
| 5,916,725 | A | | 6/1999 | Patel et al. | 430/137 |
| 5,919,595 | A | | 7/1999 | Mychajlowskij et al. | 430/137 |
| 5,925,488 | A | | 7/1999 | Patel et al. | 430/137 |
| 5,977,210 | A | | 11/1999 | Patel et al. | 523/161 |
| 5,994,020 | A | | 11/1999 | Patel et al. | 430/137 |
| 6,120,967 | A | * | 9/2000 | Hopper et al. | 430/137.14 |
| 6,132,921 | A | * | 10/2000 | Ishiyama et al. | 430/137.14 |
| 6,132,924 | A | | 10/2000 | Patel et al. | 430/137 |
| 6,210,853 | B1 | * | 4/2001 | Patel et al. | 430/137.14 |
| 6,268,102 | B1 | * | 7/2001 | Hopper et al. | 430/137.14 |
| 6,352,810 | B1 | * | 3/2002 | Jiang et al. | 430/137.14 |
| 2001/0053492 | A1 | * | 12/2001 | Suwabe et al. | 430/137.14 |
| 2002/0042012 | A1 | * | 4/2002 | Mitsuhashi et al. | 430/137.14 |

OTHER PUBLICATIONS

Copending application U.S. Ser. No. 08/922,437, Filed Sep. 2, 1997, on Metal–Accelerated Toner Processes.

Copending application U.S. Ser. No. 09/551,465, Filed Apr. 17, 2000, on Toner Coagulant Processes.

* cited by examiner

*Primary Examiner*—Christopher Rodee
(74) *Attorney, Agent, or Firm*—Robert Thompson

(57) ABSTRACT

A toner process including, for example, mixing a latex with a colorant wherein the latex contains resin and an ionic surfactant, and the colorant contains a surfactant and a colorant; adding a polyaluminum chloride; affecting aggregation by heating; adding a chelating component and a base wherein the base increases the pH of the formed aggregates; heating the resulting mixture to accomplish coalescence; and isolating the toner.

8 Claims, No Drawings

TONER COAGULANT PROCESSES

CROSS REFERENCE TO RELATED APPLICATIONS

This is a divisional of application Ser. No. 09/877,747; filed Jun. 11, 2001 now U.S. Pat. No. 6,495,302.

PENDING APPLICATIONS AND PATENTS

In the now abandoned application U.S. Ser. No. 922,437, filed Sep. 2, 1997, the disclosure of which is totally incorporated herein by reference, there is illustrated, for example, a process for the preparation of toner comprising (i) aggregating with a metal complex or metal ion a colorant dispersion with a latex emulsion and optional additives to form aggregates;

(ii) coalescing or fusing the aggregates; and optionally (iii) isolating, washing, and drying the toner.

In U.S. Pat. No. 6,132,924, the disclosure of which is totally incorporated herein by reference, there is illustrated a process for the preparation of toner comprising mixing a colorant, a latex, and two coagulants, followed by aggregation and coalescence and wherein one of the coagulants may be polyaluminum chloride.

In U.S. Pat. No. 6,268,102, the disclosure of which is totally incorporated herein by reference, there is illustrated a process for the preparation of toner comprising mixing a colorant, a latex, and two coagulants, followed by aggregation and coalescence, and wherein one of the coagulants is a polyaluminum suifosilicate.

Illustrated in U.S. Pat. No. 5,994,020, the disclosure of which is totally incorporated herein by reference, are toner preparation processes, and more specifically, a process for the preparation of toner comprising:

(i) preparing, or providing a colorant dispersion;

(ii) preparing, or providing a functionalized wax dispersion comprised of a functionalized wax contained in a dispersant mixture comprised of a nonionic surfactant, an ionic surfactant, or mixtures thereof;

(iii) shearing the resulting mixture of the functionalized wax dispersion (ii) and the colorant dispersion (i) with a latex or emulsion blend comprised of resin contained in a mixture of an anionic surfactant and a nonionic surfactant;

(iv) heating the resulting sheared blend of (iii) below about the glass transition temperature (Tg) of the resin particles;

(v) optionally adding additional anionic surfactant to the resulting aggregated suspension of (iv) to prevent, or minimize additional particle growth of the resulting electrostatically bound toner size aggregates during coalescence (iv);

(vi) heating the resulting mixture of (v) above about the Tg of the resin; and optionally, (vii) separating the toner particles; and a process for the preparation of toner comprising blending a latex emulsion containing resin, colorant, and a polymeric additive: adding an acid to achieve a pH of about 2 to about 4 for the resulting mixture; heating at a temperature about equal to, or about below the glass transition temperature (Tg) of the latex resin; optionally adding an ionic surfactant stabilizer; heating at a temperature about equal to, or about above about the Tg of the latex resin; and optionally cooling, isolating, washing, and drying the toner.

The appropriate components and processes of the above recited copending applications and patents may be selected for the processes of the present invention in embodiments thereof.

BACKGROUND OF THE INVENTION

The present invention is generally directed to toner processes, and more specifically, to chemical processes which involve the aggregation and fusion of latex, colorant like pigment, or dye, and additive particles into toner particles, and wherein aggregation can be primarily controlled by utilizing a coagulant of polyaluminum chloride (PAC), and wherein there can be selected a latex comprised of, for example, submicron resin particles of, for example, about 0.1 to about 0.4 micron in volume average diameter, suspended in an aqueous phase of water, nonionic and anionic surfactants and optionally suspended in an anionic surfactant to which is added a colorant dispersion comprising, for example, submicron colorant particles of, for example, about 0.08 to about 0.3 micron in volume average diameter, anionic surfactant, or optionally a nonionic surfactant, or mixtures thereof, and optionally adding a wax dispersion comprised of submicron wax particles, for example about 0.1 to about 0.3 micron in volume average diameter, suspended in an aqueous phase of water and an anionic surfactant, and wherein the resultant blend is optionally stirred and heated to a temperature below the resin Tg, resulting in aggregates to which optionally is added a second latex, to which there is added an organic water soluble or water insoluble chelating agent wherein soluble refers, for example, to 100 percent soluble or dissolvable, and insoluble refers, for example, to less than about 50 percent soluble, and more specifically, zero percent solubility in, for example, water, adjusting the pH of the mixture with a base, and heating the mixture to a temperature above the resin Tg, followed by lowering the pH of the mixture with an acid to fuse the aggregates.

More specifically, the present invention is generally directed to the aggregation of latex, colorant like pigment, dye, or mixtures thereof, and optionally a wax in the presence of polyaluminum chloride (PAC) and optionally aluminum salts as a second coagulant, and wherein the coalescence or fusion of the aggregates is accomplished by first adding an organic chelating reagent followed by a reduction of the pH with an aqueous solution of, for example, nitric acid wherein the chelating agent prevents the formation of aluminum ions ($Al^3$+) which could act as a coagulant thereby initiating further growth in particle size when the pH of the mixture is reduced to below about 3.5, and wherein there are generated toner compositions with, for example, a volume average diameter of from about 1 micron to about 25 microns, and more specifically, from about 2 microns to about 12 microns, and a narrow particle size distribution of, for example, from about 1.10 to about 1.33, and more specifically, a size distribution of about 1.11 to about 1.25, the size and size distribution being measured by a Coulter Counter without the need to resort to conventional pulverization and classification methods. Furthermore, the present invention in embodiments enables minimum washing, for example about 2 to about 4 washings to provide a suitable toner triboelectrical charge such as greater than about 20 $\mu$C/g at 20 percent RH. The toners generated can be selected for known electrophotographic imaging and printing processes, including digital color processes.

In embodiments of the present invention, an organic chelating component is orimarily utilized to freeze or stabilize the aggregates particle size during coalescence in the presence of a base, for example sodium hydroxide. In polyaluminum chloride (PAC) processed wherein only a base is utilized as a freezing or stabilizing agent, upon reducing the pH of the mixture below about 3.5 there results the formation of aluminum ions ($Al^3$+) which then will result in flocculation or further aggregation of the particles causing uncontrolled and undesirable processes. The present invention is directed toward overcoming this disadvantage by using organic chelation reagents which react with $Al^3$+ to form a stable complex which can withstand a low pH, for example a pH of about 2 to about 3.5 when the organic chelating reagent is, for example, 8-hydroxquinoline, salicylic acid, aluminum, 3,4-dihydrobenzoic acid, and the like, and yet more specifically, resulting in very stable complexes with metal salts, especially $Al^{3+}$ which are stable against acids and bases. Furthermore, when the toners generated are roll milled and aged over a period of, for example, about 2 to about 3 hours there results stable and negative toner charging with, for example, no or minimal wrong sign positively charged toner.

The toners generated with the processes of the present invention are especially useful for imaging processes, especially xerographic processes, which usually prefer a toner transfer efficiency. Also, the toners obtained with the processes illustrated herein can be selected for digital imaging systems, processes, and color processes wherein images with high resolution and excellent image uniformity results.

PRIOR ART

In xerographic systems, especially color systems, small sized toners of from about 2 to about 8 microns can be important to the achievement of high image quality for process color applications. It may also be important to have a low image pile height to eliminate, or minimize image feel and avoid paper curling after fusing. Paper curling can be particularly pronounced in xerographic color processes primarily because of the presence of relatively high toner coverage as a result of the application of three to four color toners. During the fusing step, moisture escapes from the paper due to high fusing temperatures of from about 120° C. to about 200° C. In the situation wherein with only one layer of toner is selected, such as in one-color black or highlight color xerographic applications, the amount of moisture driven off during fusing can be reabsorbed by the paper and the resulting print remains relatively flat with minimal paper curl. In process color where toner coverage is high, the relatively thick toner plastic covering on the paper can inhibit the paper from reabsorbing the moisture, and cause substantial paper curling. These and other imaging shortfalls and problems are avoided or minimized with the toners and processes of the present invention.

Also, it may be desirable to select certain toner particle sizes, such as from about 2 to about 10 microns, with a high colorant, especially pigment loading such as from about 4 to about 15 percent by weight of toner, so that the mass of toner necessary for attaining the desired optical density and color gamut can be significantly reduced to eliminate or minimize paper curl. Lower toner mass also ensures the achievement of image uniformity. However, higher pigment loadings, for example, of about 10 to about 20 percent by weight of toner may adversely affect the charging behavior of toners. For example, the charge levels may be too low for proper toner development or the charge distributions may be too wide and toners of wrong charge polarity may be present. Furthermore, higher pigment loading may also result in the sensitivity of charging behavior to charges in environmental conditions such as temperature and humidity. Toners prepared in accordance with the processes of the present invention minimize, or avoid these disadvantages.

There is illustrated in U.S. Pat. No. 4,996,127, the disclosure of which is totally incorporated herein by reference, a toner of associated particles of secondary particles comprising primary particles of a polymer having acidic or basic polar groups and a coloring agent. The polymers selected for the toners of the '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. In U.S. Pat. No. 4,983,488, the disclosure of which is totally incorporated herein by reference, there is disclosed a process for the preparation of toners by the polymerization of a polymerizable monomer dispersed by emulsification in the presence of a colorant and/or a magnetic powder to prepare a principal resin component and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70 microns, are obtained. This process results, it is believed, in the formation of particles with a wide particle size distribution. Similarly, the aforementioned disadvantages, for example poor particle size distributions, are obtained hence classification is usually required resulting in low toner yields are in U.S. Pat. No. 4,797,339, the disclosure of which is totally incorporated herein by reference, discloses a process for the preparation of toners by resin emulsion polymerization, wherein similar to the '127 patent certain polar resins are selected; and U.S. Pat. No. 4,558,108, the disclosure of which is totally incorporated herein by reference, discloses a process for the preparation of a copolymer of styrene and butadiene by suspension polymerization processes.

Emulsion/aggregation/coalescence processes for the preparation of toners are illustrated in a number of Xerox Corporation patents, the disclosures of each of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797; and also of interest may be U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,863,698; 5,902,710; 5,910,387; 5,916,725; 5,919,595; 5,925,488, and 5,977,210. The appropriate components and processes of the above Xerox Corporation patents can be selected for the processes of the present invention in embodiments thereof.

SUMMARY OF THE INVENTION

It is a feature of the present invention to provide toner processes with many of the advantages illustrated herein.

In another feature of the present invention there are provided simple and economical processes for the preparation of black and colored toner compositions with excellent colorant dispersions, thus enabling the achievement of excellent color print quality providing similar toner charging behavior despite differential colorant chemistry.

Another feature of the present invention resides in a process for preparing pigmented toner particles with certain coagulants, such as polyaluminum chloride which react with organic chelating reagents thereby preventing or minimizing the formation of cationic species such as aluminum ions in an acid environment, for example less than a pH of about 3.5, wherein the ions would act as a coagulant thereby initiating further undesirable growth in toner particle size.

Additionally, another feature of the present invention resides in a process capable of delivering differing toner morphology particles such as toners of a spherical shape.

A further feature of the present invention resides in the use of organic chelating reagents in conjunction with a base during coalescence or fusion, wherein the chelating reagent can permit the reduction of the pH below about 3.5, and more specifically, below about pH 2 to about 3 to thereby increase the speed of coalescence by, for example, two or three times.

Aspects of the present invention relate to a process for the preparation of electrophotographic toner comprising (i) generating a latex emulsion of resin, water, an ionic surfactant, a colorant dispersion of a colorant, water, an ionic surfactant, or a nonionic surfactant, and wherein (ii) the latex emulsion is blended with the colorant dispersion followed by optionally adding a wax dispersion comprised of submicron particles in a size diameter of, for example, about 0.1 to about 0.9 micron dispersed in an anionic surfactant of the same charge polarity as that of the ionic surfactant in the latex emulsion;

(iii) adding to the resulting blend containing the latex and colorant a coagulant of polyaluminum chloride (PAC) having an opposite charge polarity to that of the surfactant latex to thereby initiate flocculation of the resin latex and colorant;

(iv) heating the resulting mixture below or equal to about the glass transition temperature (Tg) of the latex resin to form toner sized aggregates;

(v) optionally adding a second latex comprised of submicron resin particles suspended in an aqueous phase to the formed toner aggregates of (iv) resulting in a shell or coating wherein the shell is, for example, of from about 0.1 to about 1 micron in thickness and the shell is present on about 100 percent of the aggregates;

(vi) adding an organic water soluble or insoluble chelating agent to the aggregates of (v) particles followed by changing the pH with a base; the pH of the resulting toner aggregate mixture from a pH which is about 1.9 to about 3 to a pH of about 5 to about 9 to primarily stabilize the aggregates;

(vii) heating the resulting aggregate suspension of (vi) above the Tg of the latex resin;

(viii) retaining the mixture (vii) at a temperature of from about 70° C. to about 95° C. for a period of about 3 to about 8 hours to initiate the fusion or coalescence of the toner aggregates;

(ix) changing the pH of (viii) mixture by the addition of an acid to arrive at a pH of about 1.7 to about 4, and more specifically, about 2 to about 3.3 to accelerate the fusion or the coalescence resulting in toner particle comprised of resin, colorant, and wax, wherein the toner particle size is about 2 to about 25 microns;

(x) optionally washing the resulting toner slurry; and (xi) isolating the toner; followed by drying the toner particles; a process for the preparation of toner comprising (i) generating a latex emulsion of resin, water, and an ionic surfactant, and a colorant dispersion of a colorant, water, an ionic surfactant, or a nonionic surfactant, and wherein (ii) the latex emulsion is blended with the colorant dispersion;

(iii) adding to the resulting blend containing the latex and colorant a coagulant of a polyaluminum chloride with an opposite charge to that of the ionic surfactant latex colorant;

(iv) heating the resulting mixture below or equal to about the glass transition temperature (Tg) of the latex resin to form aggregates;

(v) optionally adding a second latex comprised of submicron resin particles suspended in an aqueous phase (iv) resulting in a shell or coating wherein the shell is optionally of from about 0.1 to about 1 micron in thickness and wherein optionally the shell coating is contained on 100 percent of the aggregates;

(vi) adding an organic water soluble or water insoluble chelating component to the aggregates of (v) particles, followed by adding a base to change the resulting toner aggregate mixture from a pH which is initially from about 1.9 to about 3 to a pH of about 5 to about 9;

(vii) heating the resulting aggregate suspension of (vi) above about the Tg of the latex resin;

(viii) optionally retaining the mixture (vii) at a temperature of from about 70° C. to about 95° C.;

(ix) changing the pH of the (viii) mixture by the addition of an acid to arrive at a pH of about 1.7 to about 4; and (x) optionally isolating the toner; a process wherein the polyaluminum chloride (PAC) is selected in an amount of from about 0.05 to about 5 percent by weight of toner, and wherein the toner is comprised of the latex resin, and colorant; a process wherein the organic water soluble or insoluble chelating component is O,N, O,O or N,N-electron donating agents; a process the chelating component is selected from the group of 8-hydroxquinoline, sulfonated 8-hydroxquinoline, pyridylazonaphthial, ethylene diamine triamine, zincon, alizarin complexone, xylenol orange and methyl thymol blue; a process wherein the O,O donating chelating component is selected from the group consisting of pyrocatechol violet, aluminum, tiron, cupferron, N-benzyol-N-phenylhydroxylamines, chromotropic acid, sodium citrate, sodium oxilate, morin, alizarin red S, stilbazo, salicylic acid, 3,4 dihydrobenzoic acid and sulfonated salicylic acid; a process wherein the N,N-donating chelating component is selected from the group consisting of sulfonated bipyrdines and sulfonated tripyridytriazines; a process wherein in (vi) the chelating component primarily functions as an aggregate stabilizer and permits the pH reduction below a pH of about 3.3 in (ix) to accelerate the fusion of the aggregates without or with minimum increase in the toner particle size and the toner GSD; a process wherein the chelating component prevents or minimizes the formation of positive ions of aluminum ions ($Al^{3+}$) during (ix) at a pH lower than about 3, and wherein no further or minimal aggregation or particle size growth results; a process (vi) wherein the base is a metal hydroxide; a process wherein the base is selected from the group consisting of sodium hydroxide, potassium hydroxide, and ammonium hydroxide; a process wherein the chelating component is selected in an amount of about 0.1 to about 5 percent by weight of toner comprised of resin and colorant; a process wherein there is added to the formed toner aggregates a second latex comprised of submicron resin particles suspended in an aqueous phase containing an ionic surfactant, and wherein the second latex is optionally selected in an amount of about 10 to about 40 percent by weight of the initial latex (i) to form a shell or coating on the aggregates; a process wherein the added second latex resin forms a shell on the aggregates of (v) wherein the thickness of the formed shell is from about 0.1 to about 1 micron; a process wherein the added latex contains the same resin as the initial latex of (i), or wherein the added latex contains a dissimilar resin than that of the initial latex (i); a process wherein the aggregation (iv) is accomplished by heating at a temperature below the glass transition temperature of the polymer contained in the latex, and the coalescence (vii) is accomplished by heating at a temperature above the glass transition temperature of the polymer contained in the latex; a process wherein the aggregation temperature is from about 40° C. to about 60° C., and the coalescence temperature is from about 75° C. to about 97° C.; a process wherein the pH of the mixture resulting in (vi) is increased from an initial about 2 to about 2.6 to a final about 5 to about 8, and wherein the base optionally functions primarily as a stabilizer for the aggregates during the coalescence; a process wherein the temperature at which the aggregation is accomplished controls the size of the aggregates, isolating the toner is accomplished, and wherein the final toner size is from about 2 to about 20 microns in volume average diameter; a process wherein the colorant is a pigment, and wherein the pigment is in the form of dispersion, and which dispersion contains an ionic surfactant, and a second coagulant of a benzylalkonium to primarily enable aggregation of the latex and the colorant; a process wherein the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylononitrile-acrylic acid); a process wherein the colorant is carbon black, cyan, yellow, magenta, red, green, blue, or mixtures thereof; the toner isolated is from about 2 to about 15 microns in volume average diameter, and the particle size distribution thereof is from about 1.15 to about 1.30; and wherein there is added to the surface of the formed toner metal salts, metal salts of fatty acids, silicas, metal oxides, or mixtures thereof, each in an amount of from about 0.1 to about 10 weight percent of the obtained toner; a process wherein a polyaluminum sulfosilicate is selected as a coagulant in place of polyaluminum chloride; a process wherein the polyaluminum sulfosilicate is of the formula $$[Al_A(OH)_B(SO_4)_C(SIO_X)_D(H_2O)_E]_n$$

where A, B, C, D and E represent the number of segments, X represents the number of oxygens, and n represents the number of repeating segments; a process wherein A is 1, B is from about 0.75 to about 2, C is from about 0.30 to about 1.12, D is from about 0.005 to about 0.1, X is from about 2 to about 4, and n is from about 25 to about 300, and the polyaluminum sulfosilicate optionally possesses a weight average molecular weight of from about 5,000 to about 100,000; a process wherein an ionic surfactant is selected, and wherein the polyaluminum chloride possesses a cationic polarity, and the toner is isolated; a toner process comprising mixing a latex with a colorant wherein the latex contains resin and an ionic surfactant, and the colorant contains a surfactant and a colorant; adding a polyaluminum chloride; affecting aggregation by heating; adding a chelating component and a base wherein the base increases the pH of the formed aggregates; heating the resulting mixture to accomplish coalescence; adding an acid; and isolating the toner; a process wherein the latex and the colorant contain water, wherein the base addition provides an aggregate mixture pH of from about 5 to about 9, wherein the acid addition provides a pH of from about 1.7 to about 4, and which acid addition is accomplished after the coalescence heating; a process wherein the aggregation heating is below the latex resin glass transition temperature, and the coalescence heating is above the resin latex glass transition temperature; a toner process comprising:

(i) blending a colorant dispersion of a colorant, water, and an ionic surfactant with a latex emulsion comprised of resin, water, and an ionic surfactant; adding to the resulting blend containing the latex and colorant a coagulant of polyaluminum chloride with an opposite polarity to that of the surfactant latex to thereby initiate flocculation of the resin latex and colorant; heating the resulting mixture below about the glass transition temperature (Tg) of the latex resin to form toner aggregates; adding a second latex comprised of resin particles suspended in an aqueous phase to the formed toner aggregates resulting in a coating or a shell wherein the shell is optionally of from about 0.1 to about 1 micron in thickness; adding an organic chelating agent, followed by adjusting the mixture resulting with a base thereby resulting in a pH of about 5 to about 9; heating the resulting aggregate suspension above about the Tg glass transition temperature of the latex resin; and changing the pH of the resulting mixture by the addition of a metal salt to arrive at a pH of about 2.8 to about 5, and isolating the toner; a process wherein there is selected as a coagulant an aluminum salt of polyaluminum sulfosilicate, aluminum sulfate, or aluminum chloride; a process wherein during (ii) there is added a wax dispersion comprised of submicron particles in the optional size diameter of about 0.1 to about 0.4 micron dispersed in an anionic surfactant of the same charge polarity as that of the ionic surfactant in the latex emulsion; toner process comprising mixing a latex with a colorant wherein the latex contains resin and an ionic surfactant, and the colorant contains a surfactant and a colorant; adding a polyaluminum sulfosilicate; affecting aggregation by heating; adding a chelating component and a base wherein the base increases the pH of the formed aggregates; heating the resulting mixture to accomplish coalescence; adding an acid; and optionally isolating the toner; and a process wherein the latex can be prepared by batch polymerization or a semi-batch polymerization process containing submicron resin particles suspended in an aqueous phase of surfactants followed by aggregation with submicron pigment particle and a dual coagulant comprised of polyaluminum chloride and optionally polyaluminum sulfosilicate or aluminum sulfate; a process wherein there are provided toner compositions with low fusing temperatures of from about 140° C. to about 185° C., and which toner compositions exhibit excellent blocking characteristics at and above about, or equal to about 45° C., and generate excellent print quality and high resolution color prints; a process wherein there are provided toner compositions which provide high image projection efficiency, such as for example over 75 percent as measured by the Match Scan II spectrophotometer available from Million-Roy; a process for the preparation of toner comprising mixing a colorant, a latex, optionally a wax and a polyaluminum sulfosilicate or a polyaluminum chloride, and which coagulant assists in permitting aggregation and coalescence of the colorant, the latex resin, and when present the wax; a process for preparing a chemical toner comprising (i) generating a latex emulsion of resin, water, an ionic surfactant, a colorant dispersion of a colorant, water, and an ionic surfactant, and wherein the (ii) the latex emulsion is blended with the colorant dispersion followed by adding a wax dispersion comprised of submicron particles in the size diameter of about 0.1 to about 0.4 micron dispersed in an anionic surfactant of the same charge polarity as that of the ionic surfactant in the latex emulsion;

(iii) adding to the resulting blend containing the latex and colorant a coagulant of polyaluminum sulfosilicate (PASS) and aluminum sulfate thereby initiate flocculation of the resin latex and colorant particles;

(iv) heating the resulting mixture below or about equal to the glass transition temperature (Tg) of the latex resin to form toner sized aggregates of resin, colorant and wax when present;

(v) adding a second latex comprised of submicron resin particles suspended in an aqueous phase to the formed toner aggregates of (iv) resulting in a coating wherein the coating is, for example, of from about 0.1 to about 1 micron in thickness;

(vi) adding an organic water soluble or insoluble chelating agent to the aggregates of (v) followed by changing the pH with a base from a pH, which is about 1.9 to about 3 to a pH of about 5 to about 9, to primarily stabilize the aggregates;

(vii) heating the resulting aggregate suspension of (vi) above the Tg of the latex resin:

(viii) retaining the mixture (vii) temperature of from about 70° C. to about 95° C. for a suitable period, such as for example, of about 3 to about 10 hours to initiate the fusion or coalescence of the toner aggregates;

(ix) changing the pH of the above (viii) mixture with an acid to arrive at a pH of about 2.8 to about 5, and more specifically, about 3 to about 4.5 to accelerate the fusion or the coalescence resulting in toner particle comprised of resin, colorant, and wax, wherein the particle size is about 2 to about 25 microns;

(x) washing the resulting toner slurry; and (xi) isolating the toner; followed by drying the toner particles; a process wherein the organic chelating reagent is O,N, O,O or N,N-electron donating components selected from the group consisting of 8-hydroxquinoline, sulfonated 8-hydroxquinoline, pyridylazonaphthiol, EDTA (ethylenediaminetetraacetic acid), zincon, alizarin complexone, xylenol orange and methyl thymol blue wherein one preferred reagent is sulfonated 8-hydroxquinoline, or selected from the group consisting of pyrocatechol violet, aluminum, tiron, cupferron, N-benzyol-N-phenylhydroxylamines, chromotropic acid, sodium citrate, sodium oxilate, morin, alizarin red S, stilbazo, salicylic acid, 3,4 dihydrobenzoic acid and sulfonated salicylic acid, all O,O donating chelating reagents wherein a preferred reagent is sodium citrate, or sulfonated bipyrdines or sulfonated tripyridytriazines, all N,N-donating chelating reagents; a process wherein the polyaluminum chloride is selected in an amount of from about 0.05 to about 6 percent by weight of toner solids of latex resin, colorant, optional wax and the polyaluminum chloride, and wherein the latex resin, colorant, and wax amount totals about 100 percent; a process wherein the organic chelating reagent used to form a complex with the metal ion in (vi) is selected in an amount of from about 0.1 to about 10 percent or about 0.3 to about 5 percent by weight of toner; a process wherein the base is a hydroxide and is selected, for example, from the group consisting of sodium hydroxide, potassium hydroxide; and ammonium hydroxide, and wherein a preferred base is sodium hydroxide and wherein the base concentration is about 0.5 to about 20 percent, and more specifically, about 1 to about 10 percent by weight of water; a process wherein there is added to the formed toner aggregates a second latex comprised of submicron resin particles suspended in an aqueous phase containing an ionic surfactant, and wherein the second latex is selected in an amount of about 10 to about 40 percent by weight of the initial latex to form a shell on the aggregates; a process wherein the temperature at which the aggregation is accomplished controls the size of the aggregates, and wherein the final toner size is from about 2 to about 15 microns in volume average diameter; a process wherein the aggregation (iv) temperature is from about 45° C. to about 55° C., and wherein the coalescence or fusion temperature of (vii) and (viii) is from about 85° C. to about 95° C.; a process wherein the colorant is a pigment, and wherein the pigment is in the form of dispersion, and which dispersion contains an ionic surfactant, and wherein the polyaluminum chloride, optionally polyaluminum sulfosilicate or further optionally aluminum sulfate, functions as a coagulant and enables aggregation of the latex and the colorant; a process wherein the coagulant is added during or prior to aggregation of the latex resin and colorant, and which coagulant enables or initiates the aggregation; a process wherein the colorant is carbon black, cyan, yellow, magenta, or mixtures thereof; a process wherein the toner isolated is from about 2 to about 25 microns in volume average diameter, and the particle size distribution (GSD) thereof is from about 1.15 to about 1.30; a process which comprises mixing a latex, surfactant and colorant; heating in the presence of a polyaluminum chloride, the resulting mixture below about, or equal to about the glass transition temperature of the resin; followed by the addition of a base to stabilize the toner aggregates; thereafter adding an organic chelating reagent, followed by heating the resulting aggregates above about, or about equal to the glass transition temperature of the resin; and isolating, washing and drying the toner; a process wherein prior to isolating the heating is retained at a temperature of from about 70° C. to about 95° C. until fusion or coalescence of the aggregates is accomplished; a process wherein the polyaluminum sulfosilicate coagulant possesses a weight average molecular weight of from about 5,000 to about 100,000; a process wherein the sulfosilicate functions as a coagulant and enables or assists in enablement of the aggregation; a process wherein there is selected as a coagulant or, more specifically, a second coagulant a polyaluminum sulfosilicate of the formula $$\{Al_A(OH)_B(SO_4)_C(SIO_X)_D(H_2O)_E\}n$$

wherein A, B, C, D and E represent the segments of each species, X represents the number of oxygens; and n represents the number of segments; a process wherein A is 1, B is from about 0.75 to about 2, C is from about 0.30 to about 1.12, D is from about 0.005 to about 0.1, X is from about 2 to about 4, E is from about 5 to about 10, and n is, for example, a number of from about 10 to about 400, and more specifically, from about 25 to about 300; a process for the preparation of toner comprising mixing a colorant, a latex, and two coagulants, followed by aggregation and coalescence; a process wherein there is added to the formed toner aggregates a second latex in the amount of about 10 to about 45 percent by weight of the initial latex and preferably in an amount of about 15 to about 30 weight percent to form a shell on the first latex; a process wherein the aggregation temperature is from about 40° C. to about 62° C. and preferably is from about 45° C. to about 58° C.; a process wherein the coalescence temperature is from about 75° C. to about 95° C., and preferably about 85° C. to about 90° C.; a process wherein there is added an organic chelating agent, such as 8-hydroxquinoline, followed by the addition of a base to the aggregate mixture prior to coalescence; a process wherein the base is an alkali metal hydroxide; a process wherein the hydroxide is sodium hydroxide; a process wherein the pH of the mixture resulting after aggregation is increased from about 2 to about 2.6 to about 7 to about 8, during the coalescence, and wherein the base functions primarily as a stabilizer for the aggregates during the coalescence; a process wherein the amount of base selected is from about 0.5 to about 20 weight percent and preferably is about 1 to about 10 weight percent; a process wherein the amount of metal hydroxide selected is from about 5 to about 15 weight percent; a process wherein the latex contains submicron polymer or resin particles, containing a polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid); a process wherein the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), and poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylononitrile-acrylic acid); and other similar polymers or other similar known polymers; and wherein the colorant is a pigment; a process wherein the colorant is carbon black, cyan, yellow, magenta, or mixtures thereof; a processes for the preparation of toner particles, wherein there is selected a latex comprised of submicron resin particles, which are in the size of about 0.05 to about 0.9 micron, and more specifically, in the size of about 0.07 to about 0.35 micron, suspended in an aqueous water phase containing an ionic surfactant selected in an amount of about 0.5 to about 5 percent, and preferably about 0.7 to about 2 percent by weight of solids, to which is added a colorant dispersion comprising submicron, for example less than, or equal to about 0.5 micron, colorant particles, anionic or a nonionic surfactant which is selected in an amount of about 0.5 to about 10 percent and more specifically, about 0.6 to about 5 percent by weight of solids, which when blended together result in a mixture with a pH of about 2 to about 2.6 to which a polyaluminum chloride (PAC) solution containing an acid like nitric acid is added slowly over, for example, a period of about 2 to about 5 minutes, wherein the amount of PAC is about 0.05 to about 0.8 percent by weight of the latex solids and colorant components, and more specifically, of about 0.06 to about 0.5 percent by weight; further aggregating by stirring and heating from about 5 to 10 degrees below the resin Tg, resulting in toner aggregates of a size of about 3 to about 15 microns or about 4 to about 8 microns with a narrow GSD of, for example, about 1.14 to about 1.28 and preferably about 1.17 to about 1.25; followed by adding an organic chelating agent of 8-hydroxquinoline and then adjusting the pH of the mixture from about 2 to about 2.6 to a pH of about 6 to about 9 and preferably to about 7 to about 8.5, and more preferably to a pH of about 8 with the addition of a dilute base solution of 4 weight percent of sodium hydroxide to primarily stabilize the aggregates, further stirring and increasing the mixture temperature above the resin Tg of about 70° C. to about 95° C. and more specifically, of about 85° C. to about 93° C. for a period of about 0.5 to about 1.5 hours, followed by changing the pH from about 8 to about 2.5 by the use of an acid, such as dilute nitric acid, wherein the concentration of acid is about 0.5 to about 10 weight percent, and more specifically, about 0.75 to about 5 weight percent, and heating the mixture for an additional about 0.5 to about 4 hours and preferably from about 0.6 to about 3 hours, to fuse or coalesce the aggregates, and then washing and drying the toner; a process wherein the use of an organic chelating agent allows the pH of the mixture to be reduced below a pH of 3 thereby permitting rapid spheroidization of the toner particles wherein the spheroidization time is reduced by about 50 percent as compared to a process without the use of the chelating reagents; a process for the preparation of toner compositions which comprise blending an aqueous colorant dispersion preferably containing a pigment, such as carbon black, phthalocyanine, quinacridone or RHODAMINE B™ type, red, green, orange, brown, violet, yellow, fluorescent colorants and the like, with a latex emulsion derived from the emulsion polymerization of monomers selected, for example, from the group consisting of styrene, butadiene, acrylates, methacrylates, acrylonitrile, acrylic acid, methacrylic acid, itaconic or beta carboxy ethyl acrylate (βCEA) and the like, and which latex contains an ionic surfactant, such as sodium dodecylbenzene sulfonate, and optionally a nonionic surfactant, and which process is accomplished in the presence of a metal salt, a coagulant cationic surfactant, heating the resulting flocculent mixture at a temperature below the resin Tg for an effective length of time of, for example, about 0.5 hour to about 3 hours to form toner sized aggregates; and optionally adding a second or delayed latex wherein the latex can be the same as the above initial latex or dissimilar, followed by adjusting the pH of the mixture from about 2 to about 8 with a dilute base solution of sodium hydroxide, and subsequently heating the aggregate suspension at a temperature at or below 95° C. for a period of 0.5 to 1 hour, adjusting the pH of the mixture from about 8 to about 4.5 with a aqueous dilute metal salt of aluminum sulfate to provide spherical toner particles, isolating the toner product by, for example, filtration, washing and drying in an oven, fluid bed dryer, freeze dryer, or spray dryer.

The use of an organic chelating component can, for example, prevent the reformation of aluminum ions ($Al^{3+}$) at a low pH, for example a pH value of less than about 3.3, and which positive ions can cause the flocculation of the already formed aggregates. For example, when utilizing polyaluminum chloride as a coagulant to aggregate the latex resin particles and the colorant particles the aggregates can be stabilized against further growth by changing the pH from about 2 to about 7 with a base resulting in the conversion of the excess aluminum ions to aluminum hydroxide $Al(OH)_3$ as a precipitate. Following the pH change, the aggregates when heated above the resin Tg convert the $Al(OH)_3$ into a more stable crystalline form that can survive relatively low pH of about 3.5 when the pH is reduced from about 7 to about 3.5 with an acid in (ix). However, the $Al(OH)_3$ crystalline form becomes unstable at a pH of less than about 3.5, for example about 3.3, and converts back into the aluminum ions ($Al^{3+}$). The generation of these ions initiates further flocculation of the aggregates resulting in uncontrolled aggregation and a loss in particle size and GSD. The present invention is directed to generally resolving the problem of the reformation of the aluminum ions at low pH, for example when the pH is less than about 3.3, by using organic chelating reagents which form very stable complexes with metal salts or ions, such as aluminum ions ($Al^{3+}$), and which complexes are stable acid or base conditions and hence the reformation of the aluminum ions is prevented. Furthermore, the present invention allows the pH during the coalescence (ix) to be further reduced, for example, to about 1.9 to about 3 resulting in a more rapid coalescence or the fusion of the aggregates by about 50 percent. The present invention also permits generating acceptable stable toner triboelectrical toner values with minimum toner washings; and a process for the preparation of toner compositions with a volume average diameter of from between about 1 to about 25 microns, and preferably from about 2 to about 12 microns, and a particle size distribution of about 1.10 to about 1.28, and preferably from about 1.15 to about 1.25, each as measured by a Coulter Counter without the need to resort to conventional classifications to narrow the toner particle size distribution.

The particle size of the toner provided by the processes of the present invention in embodiments can be controlled, for example, by the temperature at which the aggregation of latex, colorant, such as pigment, and optional additives is conducted. In general, the lower the aggregation temperature, the smaller the aggregate size, and thus the final toner size. For a latex polymer with a glass transition temperature (Tg) of about 55° C. and a reaction mixture with a solids content of about 14 percent by weight, an aggregate size of about 7 microns in volume average diameter is obtained at an aggregation temperature of about 53° C.; the same latex will provide an aggregate size of about 5 microns at a temperature of about 48° C. under similar conditions.

Illustrative examples of specific latex for resin, polymer or polymers selected for the process of the present invention and present in the latex include known polymers, such as poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly (butyl acrylate-butadiene), poly(styrene-isoprene), poly (methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly (styrene-butadiene), poly(styrene-isoprene), poly(styrene-butyl methacrylate), poly(styrene-butyl acrylate-acrylic acid). poly(styrene-butadiene-acrylic acid), poly(styrene-isoprene-acrylic acid), poly(styrene-butyl methacrylate-acrylic acid), poly(butyl methacrylate-butyl acrylate), poly (butyl methacrylate-acrylic acid), poly(styrene-butyl acrylate-acrylonitrile-acrylic acid), poly(acrylonitrile-butyl acrylate-acrylic acid), and the like. The latex polymer, or resin is generally present in the toner compositions of the present invention in various suitable amounts, such as from about 75 weight percent to about 98, or from about 80 to about 95 weight percent of the toner or of the solids, and the latex size suitable for the processes of the present invention can be, for example, preferably from about 0.05 micron to about 0.5 micron in volume average diameter as measured by the Brookhaven nanosize particle analyzer. Other sizes and effective amounts of latex polymer may be selected in embodiments. The total of all toner components, such as resin and colorant, is about 100 percent, or about 100 parts.

The polymer selected for the process of the present invention can be prepared by emulsion polymerization methods, and the monomers utilized in such processes include, for example, styrene, acrylates, methacrylates, butadiene, isoprene, acrylic acid, methacrylic acid, itaconic acid, beta carboxy ethyl acrylate, acrylonitrile, and the like. Known chain transfer agents, for example dodecanethiol, from, for example, about 0.1 to about 10 percent, or carbon tetrabromide in effective amounts, such as for example from about 0.1 to about 10 percent, can also be utilized to control the molecular weight properties of the polymer when emulsion polymerization is selected. Other processes for obtaining polymer particles of from, for example, about 0.01 micron to about 2 microns in diameter can be selected from polymer microsuspension process, such as disclosed in U.S. Pat. No. 3,674,736, the disclosure of which is totally incorporated herein by reference; polymer solution microsuspension process, such as disclosed in U.S. Pat. No. 5,290,654, the disclosure of which is totally incorporated herein by reference, mechanical grinding processes, or other known processes. Also, the reactant initiators, chain transfer agents, and the like as disclosed in U.S. Ser. No. 922,437, and many of the Xerox patents mentioned herein, the disclosure of which are totally incorporated herein by reference, can be selected for the processes of the present invention.

Examples of waxes include those as illustrated herein, such as those of the recited copending applications, polypropylenes and polyethylenes commercially available from Allied Chemical and Petrolite Corporation, wax emulsions available from Michaelman Inc. and the Daniels Products Company, EPOLENE N-15 commercially available from Eastman Chemical Products, Inc., VISCOL 550-P, a low weight average molecular weight polypropylene available from Sanyo Kasei K.K., and similar materials. The commercially available polyethylenes selected are believed to possess a molecular weight of from about 1,000 to about 1,500, while the commercially available polypropylenes are believed to possess a molecular weight of from about 4,000 to about 5,000. Examples of functionalized waxes are amines, amides, for example aqua SUPERSLIP 6550, SUPERSLIP 6530 available from Micro Powder Inc., fluorinated waxes, for example POLYFLUO 190, POLYFLUO 200, POLYFLUO 523XF, AQUA POLYFLUO 411, AQUA POLYSILK 19, POLYSILK 14 available from Micro Powder Inc., mixed fluorinated, amide waxes, for example MICROSPERSION 19 also available from Micro Powder Inc., imides, esters, quaternary amines, carboxylic acids or acrylic polymer emulsion, for example JONCRYL 74, 89, 130, 537, and 538, all available from SC Johnson Wax, chlorinated polypropylenes and polyethylenes commercially available from Allied Chemical and Petrolite Corporation and SC Johnson wax.

Various known colorants, such as pigments, selected for the processes of the present invention and present in the toner in an effective amount of, for example, from about 1 to about 25 percent by weight of toner, and preferably in an amount of from about 3 to about 10 percent by weight, that can be selected include, for example, carbon black like REGAL 330®; magnetites, such as Mobay magnetites M08029™, MO8060™; Colombian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E. D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E. I. DuPont de Nemours & Company, and the like. Generally, colored pigments that can be selected are cyan, magenta, or yellow pigments, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans that may be selected include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color index as Foron Yellow SE/GLN, CI Dispersed Yellow 33 2,5-dimethoxy-4-sulfonanilide phenylazo-4'-chloro-2,5-dimethoxy acetoacetanilide, Yellow 180 and Permanent Yellow FGL. Colored magnetites, such as mixtures of MAPICO BLACK™, and cyan components may also be selected as pigments with the process of the present invention, wherein the pigment is about 3 to about 15 weight percent of the toner. Dye examples include known suitable dyes, reference the Color Index, and a number of U.S. patents, such as food dyes, and the like.

Colorants include pigment, dye, mixtures of pigment and dyes, mixtures of pigments, mixtures of dyes, and the like.

Examples of initiators for the latex preparation include water soluble initiators, such as ammonium and potassium persulfates, in suitable amounts, such as from about 0.1 to about 8 percent and preferably from about 0.2 to about 5 percent (weight percent). Examples of organic soluble initiators include VAZO peroxides, such as VAZO 64, 2-methyl 2-2'-azobis propanenitrile, VAZO 88, 2-2'-azobis isobutyramide dehydrate in a suitable amount, such as from about 0.1 to about 8 percent. Examples of chain transfer agents include dodecane thiol, octane thiol, carbon tetrabromide and the like in various suitable amounts, such as an amount of from about 0.1 to about 10 percent and preferably from about 0.2 to about 5 percent by weight of monomer.

Surfactants for the preparation of latexes and colorant dispersions can be ionic or nonionic surfactants in effective amounts of, for example, from about 0.01 to about 15, or from about 0.01 to about 5 weight percent of the reaction mixture. Anionic surfactants include sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from Kao, and the like.

Examples of cationic surfactants are dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™ available from Alkaril Chemical Company, SANIZOL™ (benzalkonium chloride), available from Kao Chemicals, and the like, in effective amounts of, for example, from about 0.01 percent to about 10 percent by weight. Preferably, the molar ratio of the cationic surfactant used for flocculation to the anionic surfactant used in the latex preparation is from about 0.5 to about 4.

Examples of nonionic surfactants selected in various suitable amounts, such as about 0.1 to about 5 weight percent, are polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™, can be selected.

The toner may also include known charge additives in effective suitable amounts of, for example, from 0.1 to 5 weight percent, such as alkyl pyridinium halides, bisulfates, the charge control additives of U.S. Pat. Nos. 3,944,493; 4,007,293; 4,079,014; 4,394,430 and 4,560,635, the disclosures of which are totally incorporated herein by reference, negative charge enhancing additives like aluminum complexes, other known charge additives, and the like.

Surface additives that can be added to the toner compositions after washing or drying include, for example, metal salts, metal salts of fatty acids, colloidal silicas, metal oxides, strontium titanates, mixtures thereof, and the like, which additives are each usually present in an amount of from about 0.1 to about 2 weight percent, reference for example U.S. Pat. Nos. 3,590,000; 3,720,617; 3,655,374 and 3,983,045, the disclosures of which are totally incorporated herein by reference. Preferred additives include zinc stearate and AEROSIL R972® available from Degussa. The coated silicas of U.S. Pat. No. 6,190,815 and U.S. Pat. No. 6,004,714, the disclosures of which are totally incorporated herein by reference, can also be selected in amounts, for example, of from about 0.1 to about 2 percent, which additives can be added during the aggregation or blended into the formed toner product.

Developer compositions can be prepared by mixing the toners obtained with the processes of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration. The carrier particles can also be comprised of a core with a polymer coating thereover, such as polymethylmethacrylate (PMMA), having dispersed therein a conductive component like conductive carbon black. Carrier coatings include silicone resins, fluoropolymers, mixtures of resins not in close proximity in the triboelectric series, thermosetting resins, and other known components. Imaging methods are also envisioned with the toners of the present invention, reference for example a number of the patents mentioned herein, and U.S. Pat. Nos. 4,265,990; 4,858,884; 4,584,253 and 4,563,408, the disclosures of which are totally incorporated herein by reference.

The following Examples and Comparative Examples are provided.

EXAMPLES

Latex Preparation—Semicontinuous Method (E/A 12–46): Latex (Linear Latex)

A latex emulsion A comprised of polymer particles generated from the emulsion polymerization of styrene, butyl acrylate and beta carboxyl ethyl acrylate (β) CEA was prepared as follows. A surfactant solution of 1.59 kilograms of DOWFAX 2A1™ (anionic emulsifier) and 430 kilograms of deionized water was prepared by mixing these components for 10 minutes in a stainless steel holding tank. The holding tank was then purged with nitrogen for 5 minutes before transferring the mixture into a reactor. The reactor was then continuously purged with nitrogen while the mixture was stirred at 100 rpm (revolutions per minute). The reactor was then heated up to 80° C.

Separately, 6.8 kilograms of ammonium persulfate initiator were dissolved in 33.55 kilograms of deionized water. Separately, a monomer emulsion was prepared in the following manner. 366 Kilograms of styrene, 86 kilograms of butyl acrylate and 14 kilograms of β-CEA, 6 kilograms of 1-dodecanethiol, 3 kilograms of dodecanediol diacrylate (ADOD), 8.05 kilograms of DOWFAX™ (anionic surfactant), and 216 kilograms of deionized water were mixed to form an emulsion. 5 Percent of the above latex emulsion was then slowly fed into the reactor containing the aqueous surfactant phase at 80° C. to form "seeds" while being purged with nitrogen. The initiator solution was then slowly charged into the reactor and after 10 minutes the rest of the emulsion was continuously fed into the reactor using metering pumps.

Once all the monomer emulsion was charged into the main reactor, the temperature was held at 80° C. for an additional 2 hours to complete the reaction. Full cooling was then applied and the reactor temperature was reduced to 35° C. The product was collected into a holding tank. After drying the latex resin molecular properties were $M_w$=60,000, $M_n$=11,800 and the onset Tg was 58.6° C. The latex was comprised of 40 percent resin, 58.5 percent water and 1.5 percent of anionic surfactant.

Example I

Preparation of Cyan Toner with Aluminum Sulfate Treatment 236.5 Grams of the above prepared latex emulsion (latex A) and 150 grams of an aqueous cyan pigment dispersion containing 49.8 grams of blue pigment PB 15.3 having a solids loading of 35.5 percent were simultaneously added to 540 milliliters of water at room temperature, about 25° C., while being mixed at a shear speed of 5,000 rpm by means of a polytron. To this mixture were added 26 grams of a polyaluminum chloride (PAC) solution containing 2.6 grams of 10 percent solids and 23.4 grams of 0.2 molar nitric acid, over a period of 2 minutes, and blended at speed of 5,000 rpm for a period of 2 minutes. The resulting mixture, which had a pH of 2.7, was then transferred to a 2 liter reaction vessel and heated at a temperature of 58° C. for 60 minutes resulting in aggregates of a size of 5.5 microns and a GSD of 1.21. To the resulting toner aggregates were added 108.2 grams of the above prepared latex (latex A) followed by stirring for an additional 30 minutes while being heated at 60° C. The particle size was found to be 6.5 and the GSD was 1.19. 1.6 Grams of sulfonated 8-hydroxquinoline were added to the resulting mixture followed by adjusting the pH from 2.7 to 7.9 and with aqueous base solution of 4 percent sodium hydroxide, and this mixture was allowed to stir for an additional 15 minutes. Subsequently, the resulting mixture was heated to 90° C. and retained there for a period of 1 hour. The pH of the resultant mixture was then lowered from about 7.6 to about 2.6 with 5 percent nitric acid. After 7 hours (total) at a temperature of 95° C., the particles were in the shape of spheres when observed under the optical microscope, and had a size of 6.5 microns with a GSD of 1.18. The reactor was then cooled down to room temperature and the particles were washed 4 times, where the first wash was conducted at a pH of 11, followed by 2 washes with deionized water, and a final wash accomplished at a pH of 2. The particles were then dried on a freeze dryer. The toner particles were comprised of 89 percent resin of latex (A) and 11 percent of the above cyan PB 15.3 pigment Example II Preparation of Yellow Toner 236.5 Grams of the above prepared latex emulsion (latex A) and 150 grams of an aqueous cyan pigment dispersion containing 119.2 grams of yellow pigment PY 74 having a solids loading of 14.8 percent were simultaneously added to 480 milliliters of water at room temperature while being mixed at a shear speed of 5,000 rpm by means of a polytron. To this mixture were added 26 grams of a polyaluminum chloride (PAC) solution containing 2.6 grams of 10 percent solids and 23.4 grams of 0.2 molar nitric acid, over a period of 2 minutes, and blended at speed of 5,000 rpm for a period of 2 minutes. The resulting mixture, which had a pH of 2.5, was then transferred to a 2 liter reaction vessel and heated at a temperature of 58° C. for 60 minutes resulting in aggregates of a size of 5.3 microns and a GSD of 1.20. To the resulting toner aggregates were added 108.2 grams of the above prepared latex (latex A) followed by stirring for an additional 30 minutes while being heated at 60° C. The particle size was found to be 6.2 and the GSD was 1.19. 1.5 Grams of 8-hydroxquinoline were added to the resulting mixture followed by adjusting the pH from about 2.7 to about 7.9 with an aqueous base solution of 4 percent sodium hydroxide followed by stirring for an additional 15 minutes. Subsequently, the resulting mixture was heated to 90° C. and retained there for a period of 1 hour. The pH of the resultant mixture was then lowered from about 7.6 to about 2.6 with a 5 percent nitric acid solution. After 7 hours (total) at a temperature of 95° C., the particles were in the shape of spheres and had a size diameter of 6.4 microns with a GSD of 1.9. The reactor was then cooled down to room temperature and the particles were washed 4 times, where the first wash was conducted at a pH of 11, followed by 2 washes with deionized water, and a final wash at a pH of 2. The particles were then dried on a freeze dryer. The toner particles resulting were comprised of 89 percent resin of latex (A) and 11 percent of the above yellow 74 pigment.

Example III

Preparation of Cyan Toner 236.5 Grams of the above prepared latex emulsion (latex A) and 150 grams of an aqueous cyan pigment dispersion containing 49.8 grams of blue pigment PB 15.3 having a solids loading of 35.5 percent were simultaneously added to 520 milliliters of water at room temperature while being mixed at a shear speed of 5,000 rpm by means of a polytron. To this mixture were added 26 grams of polyaluminum chloride (PAC) solution containing 2.6 grams of 10 percent solids and 23.4 grams of 0.2 molar nitric acid, over a period of 2 minutes, followed by blending at a speed of 5,000 rpm for a period of 2 minutes. The resulting mixture with a pH of 2.7 was then transferred to a 2 liter reaction vessel and heated at a temperature of 58° C. for 60 minutes resulting in aggregates of a size of 5.4 microns and a GSD of 1.20. To the resulting toner aggregates were added 108.2 grams of the above prepared latex (latex A) followed by stirring for an additional 30 minutes while being heated at 60° C. The particle size was found to be 6.3 and the GSD was 1.19. 2.5 Grams of salicylic acid sodium salt were added to the resulting mixture followed by adjusting the pH from about 2.7 to about 7.9 with an aqueous base solution of 4 percent sodium hydroxide, and followed by stirring for an additional 15 minutes. Subsequently, the resulting mixture was heated to 90° C. and retained there for a period of 1 hour. The pH of the resultant mixture was then lowered from about 7.6 to about 2.6 with 5 percent nitric acid. After 7 hours total at a temperature of 95° C., the particles were in the shape of spheres and had a size diameter of 6.4 microns with a GSD of 1.18. The reactor was then cooled down to room temperature and the toner particles were then washed 4 times, where the first wash was conducted at a pH of 11, followed by 2 washes with deionized water, and a final wash at a pH of 2. The particles were then dried on a freeze dryer. The toner particles resulting were comprised of 89 percent resin of latex (A) and 11 percent of the above cyan PB 15.3 pigment.

Other embodiments and modifications of the present invention may occur to those skilled in the art subsequent to a review of the information presented herein; these embodiments and modifications, equivalents thereof, substantial equivalents thereof, or similar equivalents thereof are also included within the scope of this invention.

What is claimed is:

1. A toner process comprising (i) blending a colorant dispersion of a colorant, water, and an ionic surfactant with a latex emulsion comprised of resin, water, and an ionic surfactant; adding to the resulting blend containing the latex and colorant a coagulant of polyaluminum sulfosilicate, aluminum sulfate, or polyaluminum chloride with an opposite polarity to that of the ionic surfactant in the latex emulsion to thereby initiate flocculation of the resin latex and colorant; heating the resulting mixture below about the glass transition temperature (Tg) of the latex resin to form a suspension of toner aggregates; optionally adding a second latex comprised of resin particles suspended in an aqueous phase to the formed toner aggregates resulting in a coating or a shell wherein the shell is optionally of from about 0.1 to about 1 micron in thickness; adding an organic chelating agent to the resulting mixture, followed by adjusting the mixture resulting with a base thereby resulting in a ph of about 5 to about 9; heating the resulting aggregate suspension above about the Tg glass transition temperature of the latex resin; and changing the pH of the resulting mixture by the addition of a metal salt to arrive at a pH in the of about 2.8 to about 5, and isolating said toner.

2. A process in accordance with claim 1 wherein the coagulant is polyaluminum chloride.

3. A process in accordance with claim 1 wherein the coagulant is polyaluminum sulfosilicate.

4. A process in accordance with claim 1 wherein said polyaluminum chloride is selected in an amount of from about 0.05 to about 5 percent by weight of toner.

5. A process in accordance with claim 1 wherein there is added a wax dispersion comprised of submicron particles in the optional size diameter of about 0.1 to about 0.4 micron dispersed in an anionic surfactant of the same charge polarity as that of the ionic surfactant in the latex emulsion.

6. A process in accordance with claim 1 wherein said aggregation temperature is from about 40° C. to about 60° C. and wherein the temperature at which the aggregation is accomplished controls the size of the aggregates, isolating the toner is accomplished, and wherein the final toner sizes is from about 2 to about 20 microns in volume average diameter.

7. A process in accordance with claim 1 wherein said chelating agent is an O,N, O,O or N,N-electron donating agents.

8. A process in accordance with claim 7 wherein the O,O electron donating agent is selected from the group consisting of pyrocatechol violet, cupferron, N-benzoyl-N-phenylhydroxylamines, chromotropic acid, sodium citrate, sodium oxilate, morin, alizarin red S, stilbazo, salicylic acid, 3,4 dihydrobenzoic acid and sulfonated salicylic acid.

* * * * *